3,456,177
OPERATIONAL AMPLIFIER AND REGENERATIVE MOTOR CONTROL INCORPORATING AN OPERATIONAL AMPLIFIER
Alan W. Wilkerson, Thiensville, Wis., assignor to Web Press Engineering, Inc., Addison, Ill., a corporation of Illinois
Filed May 29, 1967, Ser. No. 641,955
Int. Cl. H02p 3/14
U.S. Cl. 318—302                                                                 13 Claims

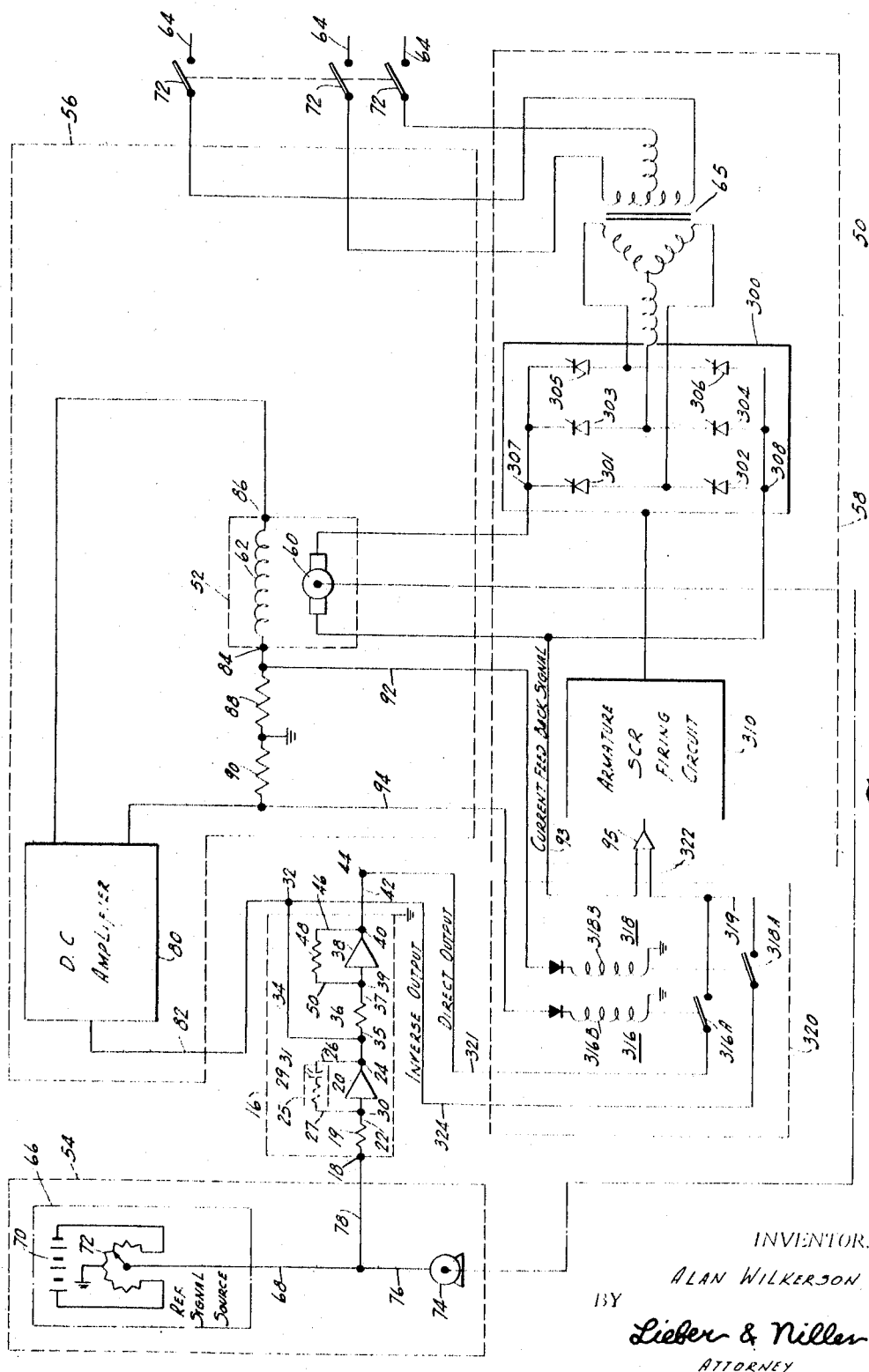

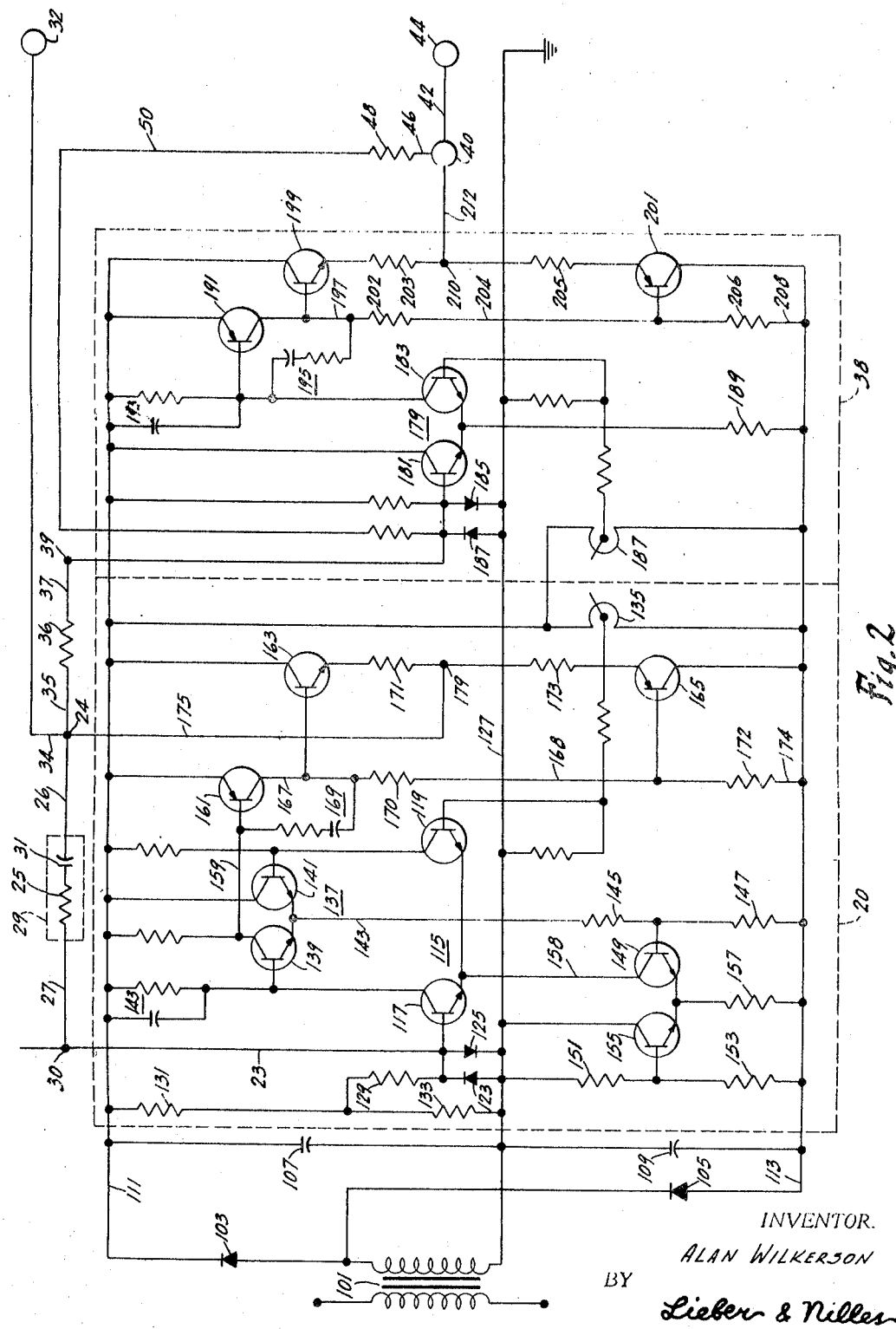

ABSTRACT OF THE DISCLOSURE

An amplifier circuit including a first amplifier of the high gain type. The first amplifier provides a phase inversion between the input and output terminals, making the polarity of the signal at the output terminal inversely proportional to the polarity of the input signal. The amplifier circuit includes a second amplifier connected in series with, and operated by the output signal of, the first amplifier. The second amplifier also provides a phase inversion between the input and output terminal so that its output signal is directly proportional in polarity to the input signal. The second amplifier maintains the desired degree of proportionality between the output signal of the first amplifier and the output signal of the second amplifier. Both the inverse output signal and the direct output signal of the amplifier circuit are employed in the regenerative control to provide motoring operation and regenerative braking to an electric motor.

BACKGROUND OF THE INVENTION

Field of the invention

The present invention relates to amplifier circuits defined in the art as operational amplifiers and to regenerative motor controls containing such amplifier circuits.

Description of the prior art

Many applications of electric motors require that the motor be braked during operation. For example, extremely accurate speed control may require that the motor be braked as soon as it exceeds a desired speed. Other examples include motors subjected to overhauling loads, as in crane, hoist and elevator service.

A highly desirable method of braking electric motors is regenerative braking. It is also desirable to provide such regenerative braking by means of static, or non-rotating, apparatus, so as to avoid the mechanical problems and limitations associated with rotating machines. Such static apparatus generally comprises electronic circuitry.

In regenerative braking, the power generated by the motor during braking is supplied back to the active power source for the motor, rather than being circulated through a passive resistor load. Power may be regenerated, or supplied back to the active power source for a motor, by reversing the polarity of the armature voltage while maintaining armature current flow in the same direction. The advantage of such a system includes the fact that the braking may be done on a permanent basis, whereas dynamic or other electrical braking methods are normally utilized only for transient conditions or for isolated stops. Also, with proper control, the armature current may be limited, thereby eliminating the excessive motor heating experienced with other methods of braking. Braking may also be accomplished very rapidly.

A regenerative motor control of the type with which the present invention is concerned is generally operable by a bi-polarity error signal, the polarity of which indicates whether the actual condition of the motor, as represented by a feedback signal, is in excess of, or less than, the desired condition of the motor, as indicated by a reference signal. The control includes a field circuit and an armature circuit for energizing the motor field and armature, respectively. The control provides for motoring operation of the motor in response to one polarity of the error signal by serving as a source of power and circulating current through the armature of the motor in a given direction and provides for regenerative operation of the motor in response to the other polarity of the error signal by continuing to pass armature current in the same direction while reversing the voltage applied to the armature of the motor by the control so that the control because a load, rather than a source, for the motor armature.

Reversal of the voltage applied to the armature is obtained through the use of an alternating current power source connected to the control. Alternating current, of course, contains one polarity of voltage during its positive half cycle and the other polarity of voltage during its negative half cycle. Such a power source thus may supply either polarity of voltage to the control and the motor armature depending on the point during the alternating current cycle at which the power source is connected to the control. This connection may be obtained and controlled by electronic means such as a controlled rectifier bridge.

During regenerative operation, to cause the motor to become a source for the control, the energization of the motor field by the field circuit of the control is revised in response to the reversal of the error signal. This reverses the motor flux and the polarity of the armature counter E.M.F., assuming the direction of motor rotation remains instantaneously the same. The reversed counter E.M.F. biased the controlled rectifiers in the bridge to conduct current in the same direction as in motor field by the field circuit of the control is reversed than the applied alternating current voltage from the power source. This will include a portion of the negative half cycle of alternating current power, permitting the reversal of the voltage applied to the motor armature necessary for regenerative operation.

Although the field circuit energizing the motor field may be made responsive to the polarity of the error signal so that a reversal of the polarity of the error signal reverses the field current, the armature circuit generally employs a uni-polar signal, for example, a positive polarity signal, to control the current conduction through the motor armature and the controlled rectifier bridge. Thus, for one polarity of the error signal, that signal is incapable of operating the armature circuit in the necessary manner.

Regenerative controls may include as a component thereof, a circuit which provides a pair of output signals corresponding to the error signal. One such output signal is directly proportional in polarity to the error signal, hereinafter sometimes called the direct output signal, while the other output signal is inversely proportional to the polarity of the error signal, hereinafter sometimes called the inverse output signal. Thus, regardless of the polarity of the error signal, there will be one signal available in the control suitable for controlling the armature circuit. For example, if the error signal is of the positive polarity, the output signal directly proportional to the error signal will be positive and may be utilized by the armature circuit. If, on the other hand, the error signal is negative, the output signal directly proportional in polarity to the error signal will be negative and unsuited for employment with the armature circuit but the output signal inversely proportional to the negative error signal will be positive and may be employed by the armature circuit to control the operation of the controlled rectifier bridge. A circuit means is provided in the control to select the one of the two output signals of the amplifier circuit which is of the polarity to properly operate the armature circuit.

Operational amplifiers lend themselves well to use in regenerative motor controls as the aforementioned circuit component. Such amplifiers are characterized by a high gain which permits them to operate at essentially zero voltage and current input, thereby making the impedance of the amplifier and the control of little significance and permitting a plurality of such controls to be inter-connected without difficulty. The high gain of such amplifiers also provides an abrupt saturation point in the output signals which may be utilized to provide current limiting action. Operational amplifiers may operate with input signals of either polarity and provide a phase inversion between the input and output terminals thereof.

When used in regenerative motor controls, however, prior art operational amplifiers and particularly prior art operational amplifiers producing the direct and inversely proportional signals required by such controls, having been unsatisfactory in operation. In the main, such unsatisfactory operation has been due to the inability of the operational amplifier to maintain the magnitude of both of the output signals proportional to the magnitude of the control input error signal over a range of control input signals and operating conditions, thereby causing an unbalance between the two output signals. Such signal unbalance has caused a deleterious effect on the operation of the control.

The inability of such prior art controls and associated operational amplifiers to maintain proportionality or balances between the magnitude of the two output signals has been due to numerous factors. The complexity of the internal circuitry in the amplifiers necessary to produce both a direct output signal and an inverse output signal has made the balancing of the amplifiers so as to maintain magnitude proportionality over a signal range difficult. The control may present external loads of differing impedances or impedances related to time to the operational amplifier which further adversely affects the balance of the direct and inverse output signals.

Noise generated by the control or present in the input signal to the control causes instabilities in the amplifier and control due to the high gain characteristics of the operation amplifier.

SUMMARY OF THE INVENTION

It is, therefore, the object of the present invention to provide an improved operation amplifier circuit and regenerative motor control including such operational amplifier. The operational amplifier provides balanced direct and inverse signals proportional to the bi-polarity input signal to the control, thereby lending improved operation to the control. The operational amplifier also improves the operation of the regenerative motor control by stabilizing such operation against noise and other transient conditions in the input signal to the control and permits the operation of the control in either the motoring or regenerative state to be altered, as for example, to provide for softer, or less abrupt, operation of the control in the braking operation than in the motoring operation.

Briefly, the present invention is directed to an improved amplifier circuit connectable to a bi-polarity input signal, for example, the error signal to a regenerative control, and providing a pair of output signals responsive to the input signal, one of the output signals corresponding directly in polarity to the input signal, the other output signal being inverse in polarity with respect to the input signal. The amplifier circuit comprises a first amplifier of the high gain type having input and output terminals and providing signal phase reversal between the terminals. The bi-polarity input signal is connected to the input terminal of the amplifier which is capable of amplifying either polarity of the input signal. The amplifier accurately and stably amplifies the input signal to the amplifier circuit. The output terminal of the first amplifier provides the inverse output signal of the amplifier circuit. The amplifier circuit also includes a second amplifier having input and output terminals and providing phase reversal between the terminals. The inverse output signal of the first amplifier is connected to the input terminal of the second amplifier. The second amplifier is also capable of amplifying an input signal of either polarity. The output terminal of the second amplifier provides the direct output signal of the amplifier circuit. The second amplifier provides the desired degree of proportionality between the inverse output signal and the direct output signal.

The present invention is also directed to a regenerative direct current motor control for regulating the energization of the field and the armature windings of a direct current motor from an alternating current power source in accordance with a bi-polarity error signal. The control includes a field circuit connected to the motor field and operatable by a bi-polarity input signal to provide current energization from the power source through the motor field. The field circuit provides current energization of one polarity or direction for one polarity of the input signal and provides current energization of the other polarity or direction for the other polarity of the input signal. The field circuit also includes means providing signals indicating the polarity of the field current energization. The control includes an armature circuit connected to, and energizing, the armature of the motor from the power source in response to an input signal of one polarity. The energization of the armature provides motoring operation to the motor for one polarity of field current energization and provides regenerative operation to the motor, in the same rotary direction, for the other polarity of field current energization. The armature circuit includes a circuit means operable by the field current energization polarity signals to provide the armature circuit with a signal of the desired polarity from input signals of either polarity.

When the amplifier circuit described above is utilized in a regenerative control, one of the direct and inverse output signals of the amplifier circuit is connected to the field circuit to form the bi-polarity input signal thereto. Both of the output signals are supplied to the circuit means in the armature circuit so that an input signal of the desired polarity is supplied to the circuit means regardless of the polarity of the bi-polarity error signal to the control.

BRIEF DESCRIPTION OF THE DRAWINGS

FIGURE 1 is a general schematic diagram of the improved operational amplifier and of a regenerative motor control incorporating such amplifier; and FIGURE 2 is a detailed schematic diagram of the amplifier circuit.

DESCRIPTION OF THE PREFERRED EMBODIMENT

Referring now to FIGURE 1, there is shown therein a regenerative motor control. Specifically, control 50 is a regenerative direct current motor control which provides both motoring and regenerative braking to a direct current motor 52. Control 50 includes a reference and feedback circuit 54, field circuit 56, and armature circuit 58. Direct current motor 52 has an armature 60 and a field 62. The control is provided with input power from AC lines 64.

Reference and feedback circuit 54 includes a reference signal source 66, providing a variable DC signal to conductor 68 by means of DC supply 70 and potentiometer 72. The feedback signal is provided by tachometer 74, which is connected to armature 60 and supplies a DC signal corresponding to the speed of armature 60 to conductor 76. Feedback signals corresponding to other operative conditions in the motor, such as torque, or operative conditions in the apparatus driven by the electric motor, as for example, web tension, may be used. Hence, the control is not to be construed solely as a motor speed control. The difference between the reference signal in conductor 68 and the feedback signal in conductor 76 forms the error signal to control 50. This error signal may be of either polarity; that is, a reference signal in conductor 68 may be positive with respect to the feedback signal in conductor 76 or the feedback signal in conductor 76 may be positive with respect to the reference signal in conductor 68. The error signal serves as a motoring signal in one polarity and a regenerative braking signal in the other polarity. The error signal is supplied to conductor 78 and thence to input terminal 18 of operational amplifier 16.

As previously noted, operational amplifier 16 includes a first amplifier 20, having its input terminal 30 connected to input terminal 18 by means of conductor 22 and resistor 19. First amplifier 20 is of the high gain type and provides a phase inverted output signal accurately proportional to the error signal to its output terminal 24. The gain or amplification of amplifier 20 may be in the magnitude of one million or more permitting operational amplifier circuit 16 to operate at or near zero input. Such a gain also provides an abrupt saturation point in the signal at output terminal 24. The output signal supplied to terminal 24 may be of either polarity and will be of the opposite, or inverse, polarity when compared to the input signal. That is, when the polarity of the input signal applied to input terminal 30 is positive, the polarity of the output signal at output terminal 24 will be negative, and vice versa. Output terminal 24 of first amplifier 20 is connected to the inverse output terminal 32 of amplifier circuit 16 via conductor 34.

The operational characteristics of first amplifier 20, including the gain and stability thereof, may be altered by adding a feedback path, such as conductors 26 and 27 from its output terminal 24 to its input terminal 30. An impedance 29 may be inserted between conductors 26 and 27 to provide the desired characteristics. See Generalized Instrumentation for Research and Teaching, Washington State University, 1964. Specifically stability against noise and transients in the error signal in conductor 78 may be provided by impedance 29. Due to the high gain of first amplifier 20, small signals of noise and transient voltage in the error signal in conductor 78 are sufficient to drive the first amplifier 20 repeatedly into saturation, thereby destroying the accuracy of control 50. To prevent this, impedance 29 may comprise capacitor 31. Capacitor 31 causes amplifier 20 to integrate the noise signals in the error signal in conductor 78, reducing their instantaneous values to a negligible amount and preventing such signals from interfering with the operational amplifier circuit 16.

Impedance 29 may include resistor 25, the magnitude of which, with respect to input resistor 19, determines the gain of first amplifier 20.

The output of first amplifier 20 at output terminal 24, in addition to being supplied to inverse output terminal 32, is supplied, through conductor 35, resistor 36, and conductor 37 to second amplifier 38. Similar to first amplifier 20, second amplifier 38 provides a phase or polarity inversion between the input signal from first amplifier 20 and the output signal supplied to output terminal 40. Output terminal 40 may be connected, via conductor 42, to the direct output terminal 44 of amplifier circuit 16. Due to the double inversion of the input signal to input terminal 18, that is, the first inversion provided by first amplifier 20 and the second inversion provided by second amplifier 38, the signal at direct output terminal 44 will correspond directly in polarity to the input signal.

The gain of second amplifier 38 is such as to maintain the desired proportionality in magnitude between the inverse output signal at inverse output terminal 32 and the direct output signal at direct ouput terminal 44 under all operating conditions. If it is desired to maintain the two signals equal in magnitude, but opposite in polarity, the gain of second amplifier 38 must be unity. If, on the other hand, it is desired to make the direct output signal greater in magnitude than the inverse output signal, the gain of second amplifier 38 may be greater than unity. Both signals, of course, will still be proportional in magnitude to the input signal, though not to each other. Output signals of differing proportional magnitudes may be used to provide, for example, softer braking than motoring operation to the motor, as hereinafter described.

Second amplifier 38 includes a feedback signal supplied from the output terminal 40 to the input terminal 39 via conductors 46 and 50. This feedback signal path provides a means for establishing the desired proportionality between the direct and inverse output signals. In cases in which it is desired to make the direct output signal at output terminal 44 equal in magnitude to the inverse signal at output terminal 32, a resistor 48, equal in value to resistor 36 may be inserted in feedback conductor 46, thereby to cause the output signal of second amplifier 38 at terminal 40 to equal the input signal to second amplifier 38. In cases in which it is desired to make the output signal at direct output terminal 44 proportionally greater than the signal at inverse output terminal 32, the value of resistor 48 may be made greater than the value of resistor 36, thereby increasing the magnitude of the output signal at direct output terminal 44.

As will be appreciated from the foregoing, operational amplifier 16, in effect, divides the necessary operative functions of the amplifier between first amplifier 20 and second amplifier 38. Thus first amplifier 20 provides the necessary high gain and accuracy characteristic to operational amplifier 16 while at the same time providing the necessary stability against noise in the control input signal. Second amplifier 38 provides the desired proportionality and balance characteristics to operational amplifier 16 so that the direct output signal is, at all times, proportional to the inverse output signal and vice versa. By this separation of functions, the circuitry of operation amplifier 16 is rendered far less complex than prior art operational amplifiers and the operation of operational amplifier 16 improved over such operational amplifiers.

Field circuit 56 includes motor field 62. The field may be energized in polarity and magnitude of current by a means, such as bi-polarity DC amplifier 80, which circulates current in either direction through motor field 62. DC amplifier 80 is operated by a bi-polarity input signal in conductor 82, which may be either the inverse output signal of amplifier circuit 16 from output terminal 32, or the direct output signal of amplifier circuit 16 from terminal 44. The use of the inverse output signal from terminal 32 is illustratively shown in FIGURE 1. DC amplifier 80 may provide field current in terminal 84 of field 62 for one polarity of the inverse output signal, and provide current in terminal 86 for the other polarity of the inverse output signal of amplifier circuit 16. A means of sensing the polarity and magnitude of the current in motor field 62, such as resistors 88 and 90 is also provided in field circuit 56. The sensings are provided to conductors 92 and 94.

Armature circuit 56 is supplied with power from alternating current supply lines 64 and transformer 65. The energization of motor armature 60 is controlled by armature controlled rectifier bridge 300 containing controlled rectifiers 301 through 306. Armature controlled rectifier firing circuit 310 controls the operation of the rectifier in armature controlled rectifier bridge 300. In order for control 50 to provide both motoring operation and regenerative braking operation to motor 52, the armature controlled rectifier firing circuit must be capable of controlling the operation of the controlled rectifiers through all the positive half cycle of alternating current from supply lines 64, for motoring operation, and through a portion of the negative half cycle, for regenerative operation. Armature controlled rectifier firing circuit 310 amplifies and converts a controlling signal of one polarity into firing pulses suitable for firing the controlled rectifiers of armature control rectifier bridge 300.

Circuit means 320 provides a controlling signal to armature circuit 58 and specifically to armature controlled rectifier firing circuit 310 so as to energize the armature during motoring and regenerative braking operation. As shown in FIGURE 1, circuit means 320 may be a switch comprised of two relays 316 and 318 operated by the field current polarity signals in conductors 92 and 94.

The switching contact 316A of relay 316 is connected in conductor 321 so that when the contact is closed, by the energization of relay coil 316B, a signal of the magnitude and polarity of the direct output signal at direct output terminal 44 is supplied to conductor 322 and to armature controlled rectifier firing circuit 310. The switching contact 318A of relay 318 is connected in conductor 324 so that when switching contact 318A is closed by the energization of relay coil 318B, a signal of the magnitude and polarity of the inverse output signal at inverse output terminal 32 is supplied to conductor 322 and to armature controlled rectifier firing circuit 310.

Armature controlled rectifier firing circuit 310 may contain appropriate circuitry to limit the armature current during both motoring and regenerative operation. For example, a current feedback signal from motor armature 60 may be supplied via conductor 93 to current regulating amplifier 95. The reference signal to current regulating amplifier 95 may comprise the signal in conductor 322. Current regulating amplifier 95, armature controlled rectifier firing circuit 310, controlled rectifier bridge 300, motor armature 60, and the feedback signal in conductor 93 thus form an inner current regulating control loop inside the speed control loop employing the speed feedback signal from tachometer 74 and operational amplifier 16 in addition to the aforementioned components. The armature current is regulated to the magnitude of the signal in conductor 322 so that when operational amplifier 16 saturates, the armature current is limited to a value corresponding to the saturated output of operational amplifier 16.

To operate control 50 in the motoring state, signal source 54 is adjusted to provide a signal corresponding to the desired motoring speed. This signal may, for example, be of the positive polarity and is supplied to conductor 68. As armature 60 is not yet rotating, there will be no feedback signal supplied by tachometer 74, so that the bi-polarity error signal to control 50 in conductor 78 is of the magnitude and polarity of the reference signal in conductor 68. Amplifier circuit 16 produces a direct output signal and an inverse output signal proportional to the input signal in conductor 78. The direct output signal at terminal 44 will be of the positive polarity and the inverse output signal at terminal 32 will be of the negative polarity.

Field circuit 56 utilizes the inverse output signal in conductor 82 to energize motor field 62. For example, the field current may flow in terminal 84 and out terminal 86. This provides current energization through motor field 62 which is sensed by resistors 88 and 90 to provide field current polarity signals in conductors 92 and 94 to circuit means 320.

The direct and inverse output signals of amplifier circuit 16 are supplied to circuit means 320 by conductors 321 and 324, respectively. In the present exemplary case, the field current polarity signal in conductor 94 energizes relay 316 to close relay contacts 316A and supply the direct output signal existing in conductor 321 to conductor 322 and to the input of armature controlled rectifier firing circuit 310. This signal serves as the controlling signal to firing circuit 310 to operate armature controlled rectifier firing circuit 310 and energize motor armature 60 through controlled rectifier bridge 300 to accelerate the armature.

Acceleration of armature 60 causes tachometer 74 to generate a feedback signal in conductor 76 which reduces the magnitude of the error signal existing in conductor 78. The magnitude of the controlling signal to armature controlled rectifier firing circuit 310 is likewise reduced as is the energization of armature 60. Regulation of the speed of armature 60 is obtained by controlling the firing angle of the controlled rectifiers in armature controlled rectifier bridge 300, in the positive half cycle of the alternating current in alternating current supply line 64.

Regenerative operation of control 50 may be brought on by reducing the reference signal in conductor 78 or by providing an overhauling load to armature 60. In either case, the feedback signal generated by tachometer 74 in conductor 76 exceeds the reference signal generated by reference signal source 54 in conductor 68. This reverses the polarity of the error signal in conductor 78 and the error signal to control 50. The reversed polarity of the input signal to amplifier circuit 16 reverses the polarity of the direct and inverse output signals at terminals 32 and 44, respectively. That is, the direct output signal is now of the negative polarity, while the inverse output signal is of the positive polarity. The reversed polarity of the inverse output signal in conductor 82 causes amplifier 80 to energize motor field 62 by supplying current in terminal 86 and out terminal 84. The current in motor field 62 is reversed, reversing the counter E.M.F. of armature 60 of motor 52, so that for a portion of the negative half cycle of the alternating current in alternating current supply lines 64, the counter E.M.F. of motor 52 is more negative than the applied voltage even though the applied voltage is negative with respect to the neutral of the alternating current supply. In this portion of the negative half cycle, the controlled rectifiers in rectifier bridge 300 will be properly biased for conduction and if properly fired will conduct current from motor armature 60, as an electrical source, to alternating current supply lines 64, as an electrical load, thereby providing regenerative braking to motor armature 60.

Considering now the operation of armature circuit 58 to properly fire the controlled rectifiers in rectifier bridge 300, the reversal of the current through motor field 62 reverses the polarity of the signals in conductors 94 and 92 and opens relay 316 and closes relay 318. This supplies the reversed inverse output signal in conductor 324 to conductor 322 and armature controlled rectifier firing circuit 310. As the inverse output signal is now positive, it is of the proper polarity to operate armature controlled rectifier firing circuit 310 to fire the controlled rectifiers in bridge 300 to cause the motor 52 to regenerate power back to the alternating current supply lines 64.

FIGURE 2 shows the details of amplifier circuit 16. The amplifier circuit is energized by a power supply comprised of transformer 101, diodes 103 and 105, and capacitors 107 and 109. The power supply energizes positive direct current bus 111 and negative direct current bus 113.

First amplifier 20 includes input terminal 30 and provides a phase reversed output signal at the output terminal 24. First amplifier 20 may include a means to provide a feedback signal between output terminal 24 and input terminal 30 such as conductors 26 and 27 and impedance 29. As previously noted, the electrical characteristic of the means providing the feedback signal determines the electrical characteristics of amplifier circuit 16.

First amplifier 20 includes a first differential amplifier 115 comprised of transistors 117 and 119, having their emitters connected together. The base terminal of transistor 117 is connected to input terminal 30 via conductor 23. A pair of diodes 123 and 125 are connected in opposite polarities between the base terminal of transistor 117 and common, grounded conductor 127 to limit the magnitude of the input signal which may be applied to the base of transistor 117. Specifically, when the magnitude of the input signal in conductor 22 excess the forward conduction voltage of diode 123 or 125, the diode breaks down and short circuits the input signal to conductor 127, thereby preventing an input signal in excess of the breakdown voltage from being applied to the base terminal of transistor 117. This prevents excessive input signals from overdriving amplifier 115. Two diodes are provided to accommodate input signals of either polarity.

In order to maintain the input of transistor 117 at zero, a path for the small base current required to establish the operating point of transistor 117 is provided by resistor 129, which is connected to the base terminal of transistor 117 and to the center of a voltage divider comprised of resistor 131 and resistor 133. The voltage divider provides a small voltage which is used to null the voltage drop across resistor 129 caused by the current.

Transistor 119 is biased into the desired operating state by a signal provided by potentiometer 135. Potentiometer 135 is adjusted so that amplifier 20 provides zero output with zero input to terminal 30.

So as to provide the desired gain and accuracy, first amplifier 20 includes a second differential amplifier 137, comprised of transistors 139 and 141. The base terminal of transistor 139 is connected to the emitter-collector circuit of transistor 117, while the base of transistor 141 is connected to the emitter-collector circuit of transistor 119. The base of transistor 139 is connected to resistor-capacitor network 143, which prevents oscillation in the amplifier.

The first amplifier 20 includes a common mode feedback system which renders the amplifier insensitive to variations in external conditions, such as power supply voltage variations, or variations in ambient temperature. The common mode feedback system is so called because it measures the operating point of both transistor 139 and transistor 141 and adjusts the operation of the transistors in the same manner to restore their operating points to the desired level. The feedback system includes a feedback signal corresponding to the sum of the emitter current of transistors 139 and 141, generated in conductor 143. This signal is supplied to a voltage divider comprised of resistor 145 and resistor 147, and a feedback signal corresponding to the voltage across resistor 147 is supplied to the base terminal of transistor 149. A reference voltage is developed by the voltage divider comprised of resistors 151 and 153, and a reference signal corresponding to the voltage across resistor 153 is supplied to the base terminal of transistor 155. The emitters of transistors 149 and 155 are connected together and to negative direct current bus 113 by resistor 157. The collector of transistor 155 is connected to neutral bus 127, while the collector of transistor 149 is connected to the common emitter of transistors 117 and 119 through conductor 158.

In operation, the operating level of transistors 139 and 141 of first amplifier 20 is determined by comparing the feedback signal representing the sum of the emitter currents of transistors 139 and 141, as generated by resistor 147, with the reference signal developed across resistor 153. If the two signals are not identical, a signal will be generated in conductor 158, which will adjust the emitter-collector current of transistors 117 and 119, so as to operate transistors 139 and 141 to bring the signal in conductor 143 into identity with the reference signal generated across resistor 153. In this manner, the operating point of second differential amplifier remains constant in spite of power supply voltage variations, or other external conditions.

The output of second differential amplifier 137 is taken from the collector of transistor 139 via conductor 159, thereby providing the phase inversion to first amplifier 20. The output is supplied to the base terminal of transistor 161. Transistor 161 serves as a driver for a complimentary pair of transistors 163 and 165, connected in the common collector or emitter follower configuration. Transistor 161 also has a resistor-capacitor oscillation suppression circuit 169 connected between its base and collector terminals. Transistor 161 provides an output signal to conductor 167. The base terminal of transistor 163 is connected to conductor 167. Transistor 163 may be of the NPN type, having its collector connected to the positive direct current bus 111. Transistor 165 is of the PNP type, having its base terminal connected to conductor 168 and its collector terminal connected to negative direct current bus 113. Conductors 167 and 168 are connected through bias resistor 170. Conductor 168 is connected through bias resistor 172 and conductor 174 to negative direct current bus 113. The emitters of the two transistors are connected through excessive current protection resistors 171 and 173 and are connected to inverted output terminal 24 of first amplifier 20 via conductor 175 and junction 179. The complimentary pair of transistors 163 and 165 permit output signals of either polarity to be provided to inverse output terminal 32 of amplifier circuit 16 via conductor 34.

The output terminal 24 of first amplifier 20 is connected by conductor 35, resistor 36, and conductor 37 to the input terminal 39 of second amplifier 38. Second amplifier 38 may contain a differential amplifier 179 comprised of transistors 181 and 183. The base terminal of transistor 181 is connected through oppositely poled diodes 185 and 187. Diodes 185 and 187 serve the same function as diodes 123 and 125 in limiting the input signal that can be applied to transistor 181. The base terminal of transistor 181 is biased by a signal from potentiometer 187 which determines the operating point of differential amplifier 179. The emitter terminals of transistors 181 and 183 are connected together and to negative direct current bus 113 through resistor 189. The collector of transistor 181 is connected to positive direct current bus 111, while the collector of transistor 183 is connected to the base terminal of driver transistor 191, thereby providing the phase inversion to second amplifier 83. The base terminal of transistor 191 is connected to the appropriate resistor-capacitor oscillation prevention circuits 193 and 195. The emitter of transistor 191 is connected to positive current bus 111, while the collector is connected to conductor 197, bias resistor 202, conductor 204, bias resistor 206, conductor 208, and negative direct current bus 113.

Conductor 197 is connected to the base terminal of transistor 199 of a second complimentary pair of transistors connected in the common collector or emitter follower configuration. The collector of transistor 199 is connected to positive direct current bus 111. The base terminal of transistor 201 is connected to conductor 204 and the collector of transistor 201 is connected to negative direct current bus 113. The emitter terminals of transistors 199 and 201 are connected together through excessive current protection resistors 203 and 205, and to junction 210 and conductor 212 to provide a signal to the output terminal 40 of second amplifier 38 and to direct output terminal 44 via conductor 42.

A feedback signal is provided from output terminal 40 through resistor 48 to the base of transistor 181 by means of conductors 46 and 50. The magnitude of this feedback signal, as determined by the value of resistor 48, determines the gain of second amplifier 38. As previously noted, the value of resistor 48 may be varied depending on the gain desired of second amplifier 38 so as to provide the desired ratio between resistors 36 and 48.

Various modes of carrying out the invention are contemplated or being within the scope of the following claims particularly pointing out and distinctly claiming the subject matter which is regarded as the invention.

I claim:

1. An amplifier circuit suitable for use in a regenerative direct current motor control for regulating the energization of the field and the armature of a direct current motor from a power source in accordance with a bi-polarity error signal and comprising; a field circuit, operable by a bi-polarity signal corresponding to the error signal to provide current energization of either polarity from the power source through the motor field, said field circuit providing current energization of one polarity for one polarity of said bi-polarity signal and providing current energization of the other polarity for the other polarity of said bi-polarity signal, said field circuit including means providing field current energization polarity signals; an armature circuit connected to, and energizing, the armature of the motor from the power source in response to a signal of one polarity, said energization of the armature providing motoring operation to the motor for one polarity of field current energization and providing regenerative operation to the motor, in the same rotary direction, for the other polarity of field current energization, said armature circuit including circuit means operable by said field current energization polarity signals to provide to said armature a signal of the desired polarity from signals of either polarity; said amplifier circuit connected to the bi-polarity error signal and providing a pair of bi-polarity signals corresponding to the error signal, one of said signals being directly proportional in polarity to the error signal, the other of said signals being inversely proportional in polarity to the error signal, said amplifier circuit comprising:

a first amplifier having input and output terminals and providing signal phase reversal between said terminals, the error signal being connected to said input terminal, said output terminal providing the inverse signal of said amplifier; and a second amplifier having input and output terminals and providing signal phase reversal between said terminals, said inverse signal of said first amplifier being connected to the input terminal of said second amplifier, said output terminal of said second amplifier providing the direct signal of said amplifier circuit, one of said direct and inverse signals of said amplifier circuit being connected to said field circuit to form the bi-polarity signal thereto, both of said signals being supplied to said circuit means so that a signal of the desired polarity is supplied to said circuit means regardless of the polarity of said bi-polarity error signal.

2. The amplifier circuit according to claim 1 further defined in that said first amplifier is a high gain amplifier, accurately amplifying said error signal, and said second amplifier is a proportional amplifier, maintaining the desired degree of proportionality between said inverse signal of said first amplifier and said direct output signal of said second amplifier.

3. The amplifier circuit according to claim 2 further defined in that said first amplifier includes a means providing stability to said first amplifier against noise in said error signal.

4. The amplifier circuit according to claim 3 further defined in that said first amplifier includes a feedback means connecting the output terminal of said amplifier to the input terminal of said amplifier, said feedback means including means to regulate the gain of said amplifier and said means providing stability to said first amplifier.

5. The amplifier circuit according to claim 2 further defined in that said second amplifier includes a means to adjust the degree of proportionality maintained between said inverse signal of said first amplifier and said direct output signal of said second amplifier.

6. The amplifier circuit according to claim 5 further defined in that said second amplifier includes a feedback means connecting the output terminal of said amplifier to the input terminal of said amplifier, said feedback means including said means to adjust the degree of proportionality maintained between said inverse signal of said first amplifier and said direct output signal of said second amplifier.

7. The amplifier circuit according to claim 4 wherein said first amplifier includes a two stage differential amplifier connected to said input terminal.

8. The amplifier circuit according to claim 7 wherein said two stage differential amplifier contains a second feedback means compensating said differential amplifier in a non-differential manner to maintain said differential amplifier at the desired operating level.

9. The amplifier circuit according to claim 8 wherein said differential amplifier is connected through a driving amplifier to a complimentary pair of transistors connected in emitter follower configuration, said pair of transistors connected to said output terminal of said first amplifier to provide an inverse output signal of either polarity in response to said error signal.

10. The amplifier circuit according to claim 5 wherein said second amplifier includes a single stage differential amplifier.

11. The amplifier circuit according to claim 10 wherein said differential amplifier is connected through a driver to a complimentary pair of transistors connected in emitter follower configuration, said pair of transistors connected to said output terminal of said second amplifier to provide a direct output signal of either polarity in response to said inverse signal.

12. A regenerative direct current motor control for regulating the energization of the field and the armature of a direct current motor from a power source in accordance with a bi-polarity error signal comprising in combination; a field circuit, operable by a polarity signal corresponding to the error signal to provide current energization of either polarity from the power source through the motor field, said field circuit providing current energization of one polarity for one polarity of said bi-polarity signal and providing current energization of the other polarity for the other polarity of said bi-polarity signal, said field circuit including means providing field current energization polarity signals; an armature circuit connected to, and energizing, the armature of the motor from the power source in response to a signal of one polarity, said energization of the armature providing motoring operation to the motor for one polarity of field current energization and providing regenerative operation to the motor, in the same rotary direction, for the other polarity of field current energization, said armature circuit including circuit means operable by said field current energization polarity signals to provide to said armature a signal of the desire polarity from signals of either polarity; and the improvement comprising:

an amplifier circuit connected to the bi-polarity error signal and providing a pair of bi-polarity signals corresponding to the error signal, one of said signals being directly proportional in polarity to the error signal, the other of said signals being inversely proportional in polarity to the error signal, said amplifier circuit comprising:

a first amplifier having input and output terminal and providing signal phase reversal between said terminals, the error signal being connected to said input terminals, said output terminal providing the inverse signal of said amplifier; and a second amplifier having input and output terminals and providing signal phase reversal between said terminals, said inverse signal of said first amplifier being connected to the input terminal of said second amplifier, said output terminal of said second amplifier providing the direct signal of said amplifier circuit, one of said direct and inverse signals of said amplifier circuit being connected to said field circuit to form the bi-polarity signal thereto, both of said signals being supplied to said circuit means so that a signal of the desired polarity is supplied to said circuit means regardless of the polarity of said bi-polarity error signal.

13. The regenerative direct current motor control according to claim 12 further defined in that the first amplifier of said amplifier circuit is a high gain amplifier, accurately amplifying said error signal, and said second amplifier is a proportional amplifier, maintaining the desired degree of proportionality between said inverse signal of said first amplifier and said direct output signal of said second amplifier.

References Cited

UNITED STATES PATENTS 2,783,427   2/1957   Bracutt ------------ 318—338

FOREIGN PATENTS 687,000   3/1965   Italy.

ORIS L. RADER, Primary Examiner

K. E. CROSSON, Assistant Examiner

U.S. Cl. X.R.

318—308, 338